UNITED STATES PATENT OFFICE.

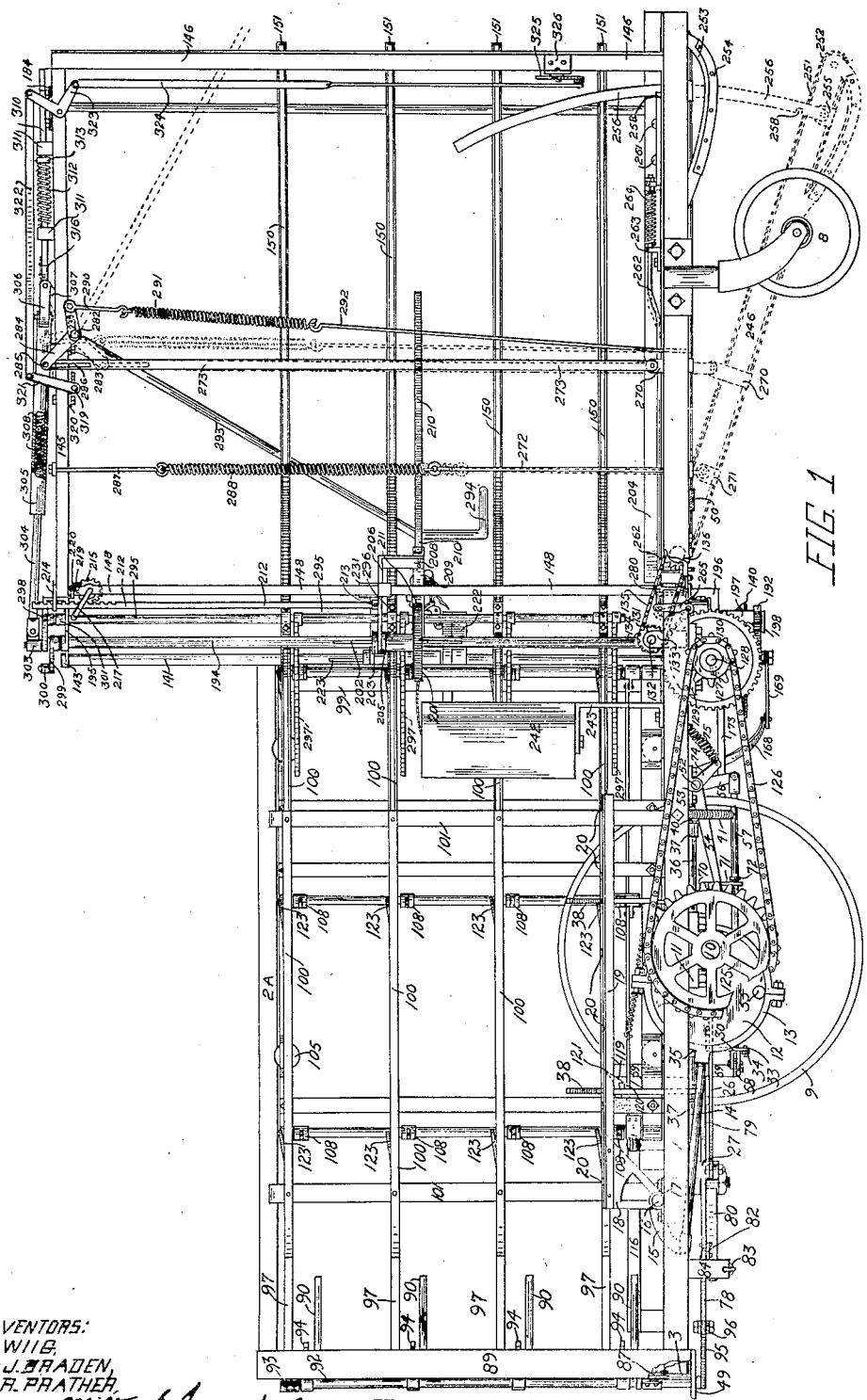

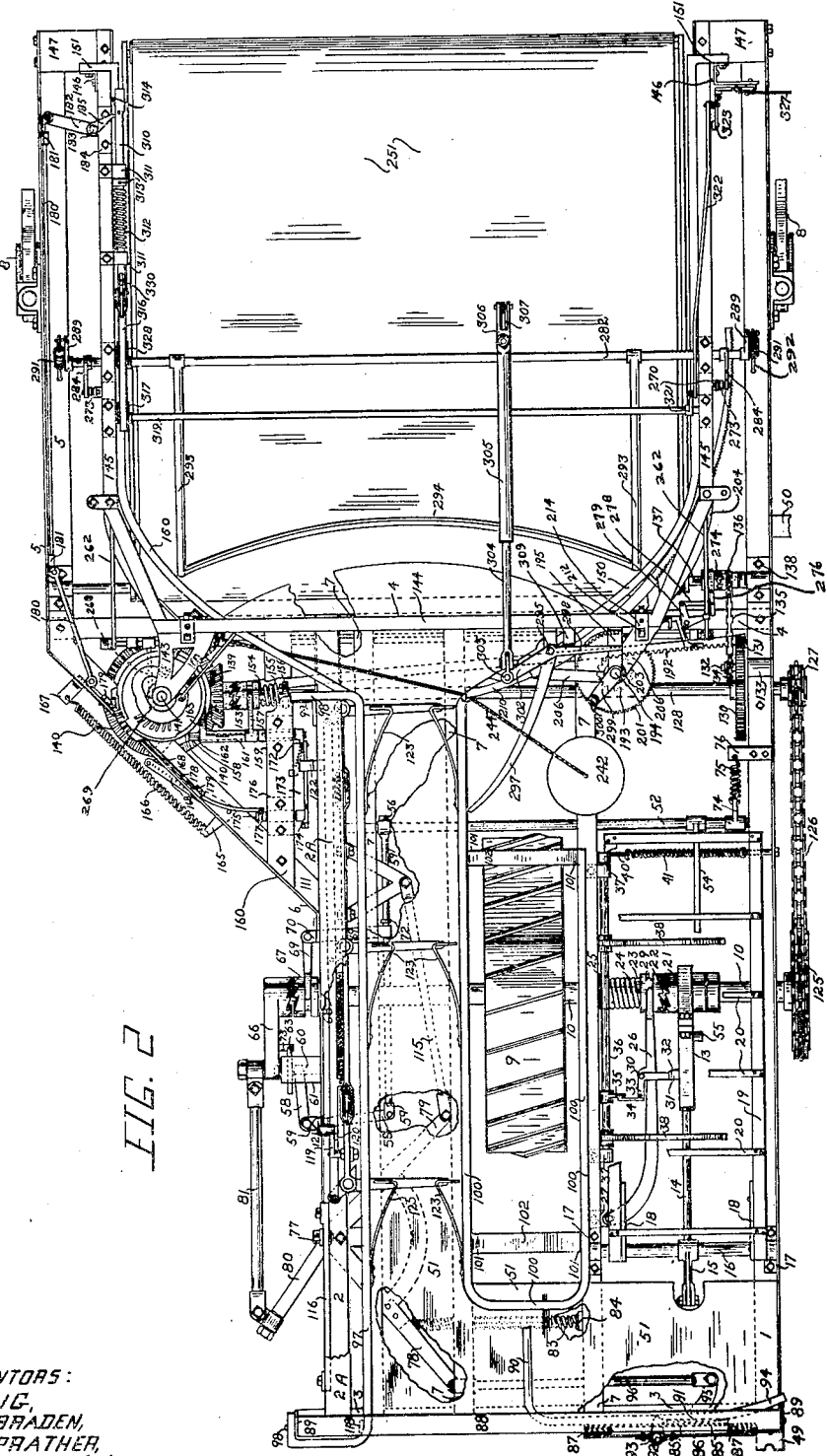

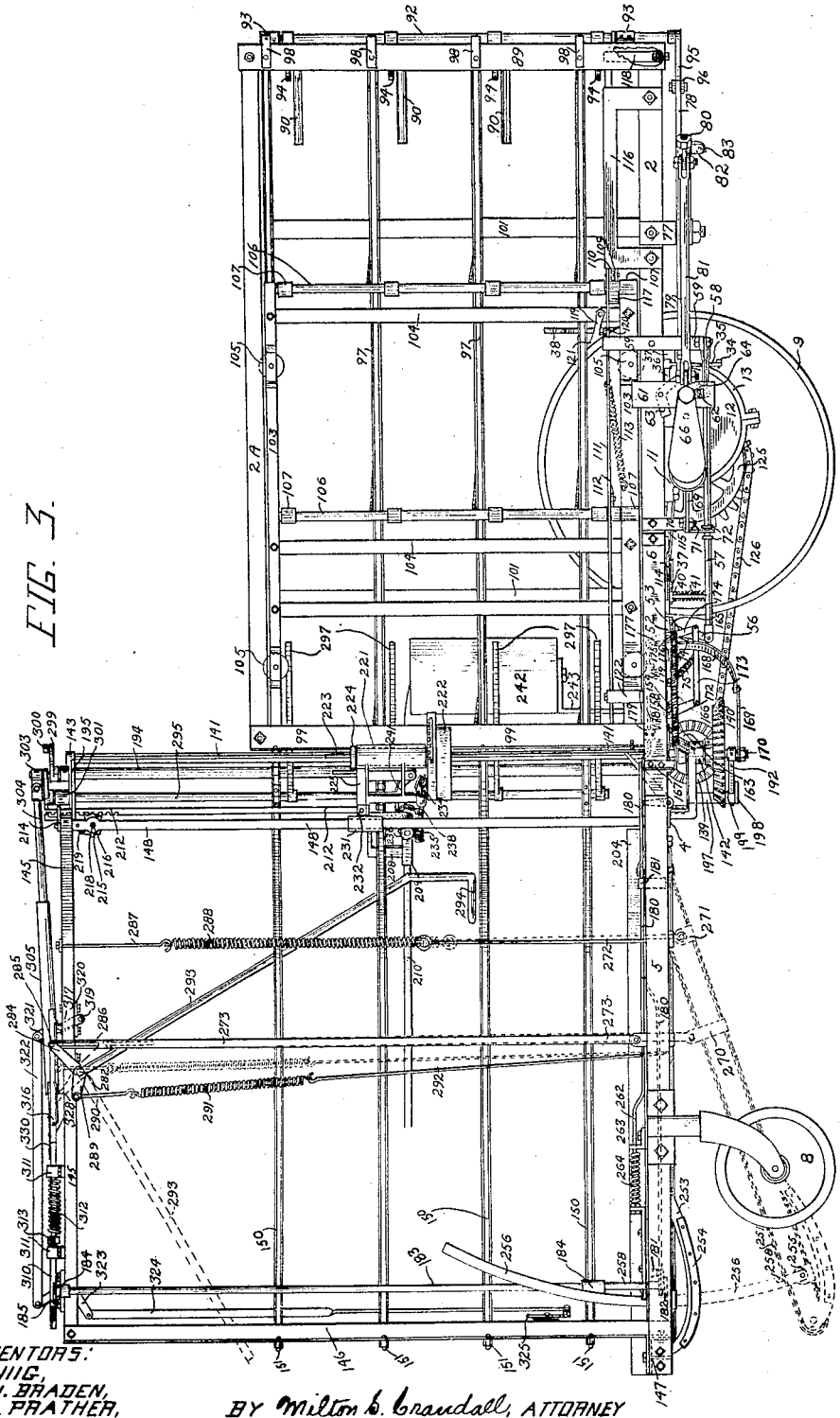

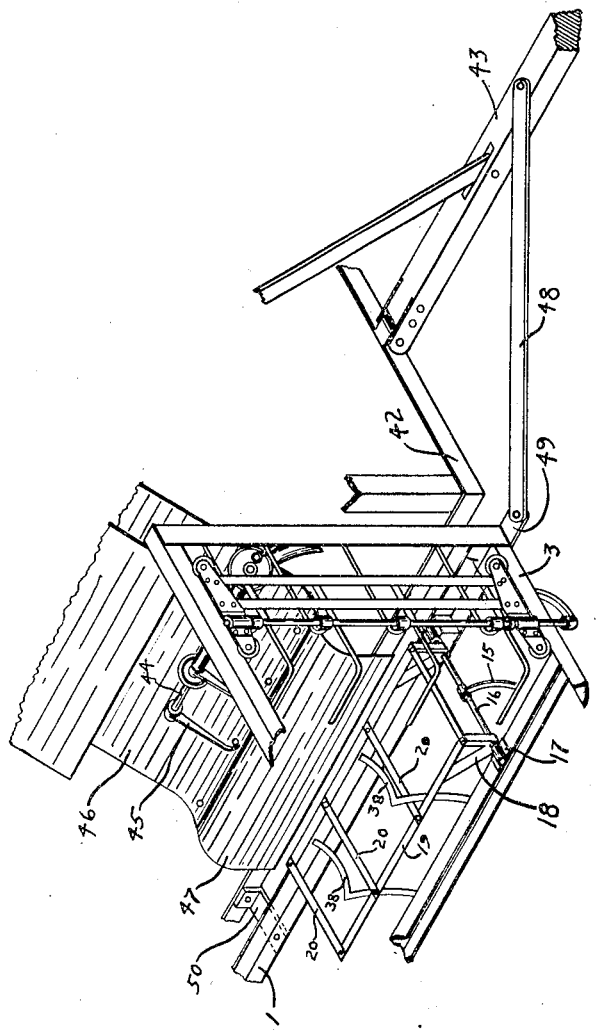

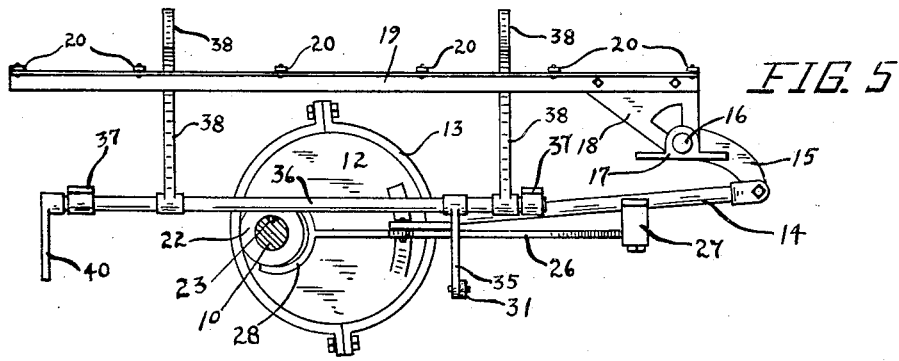
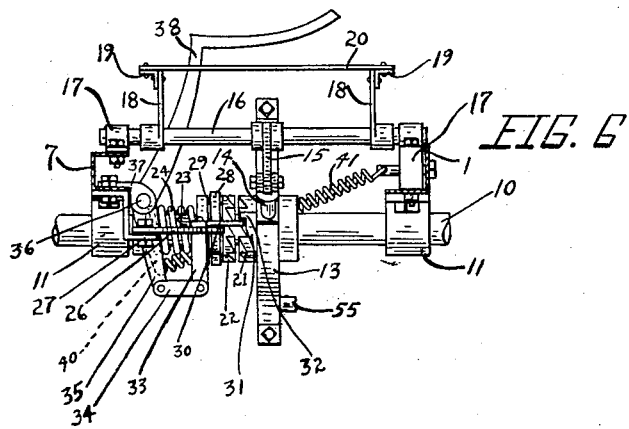
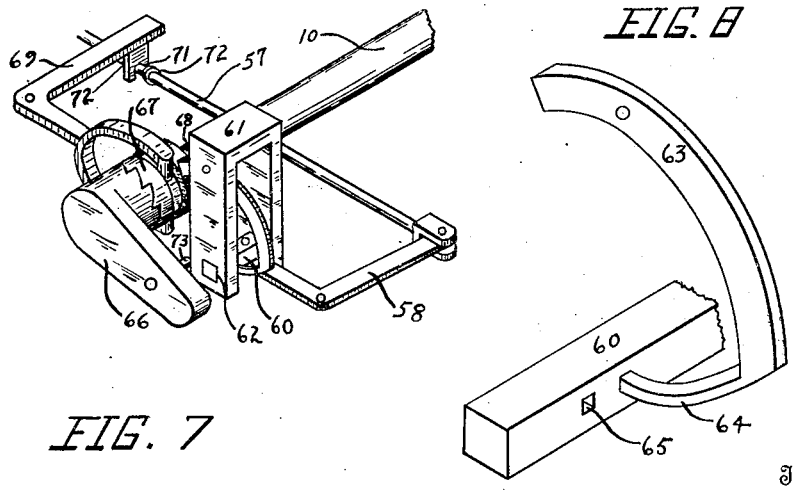

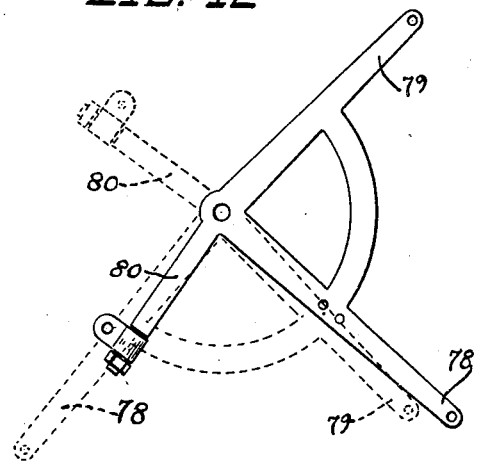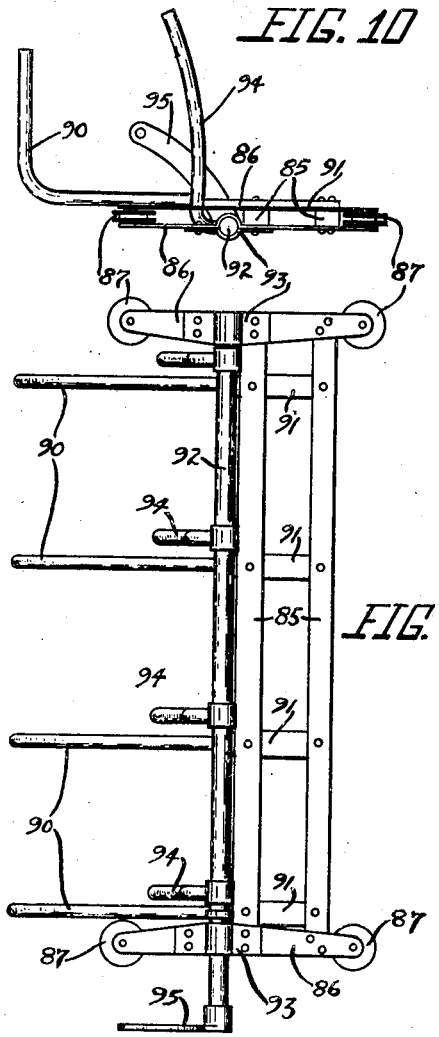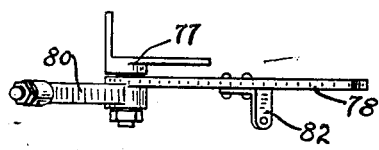

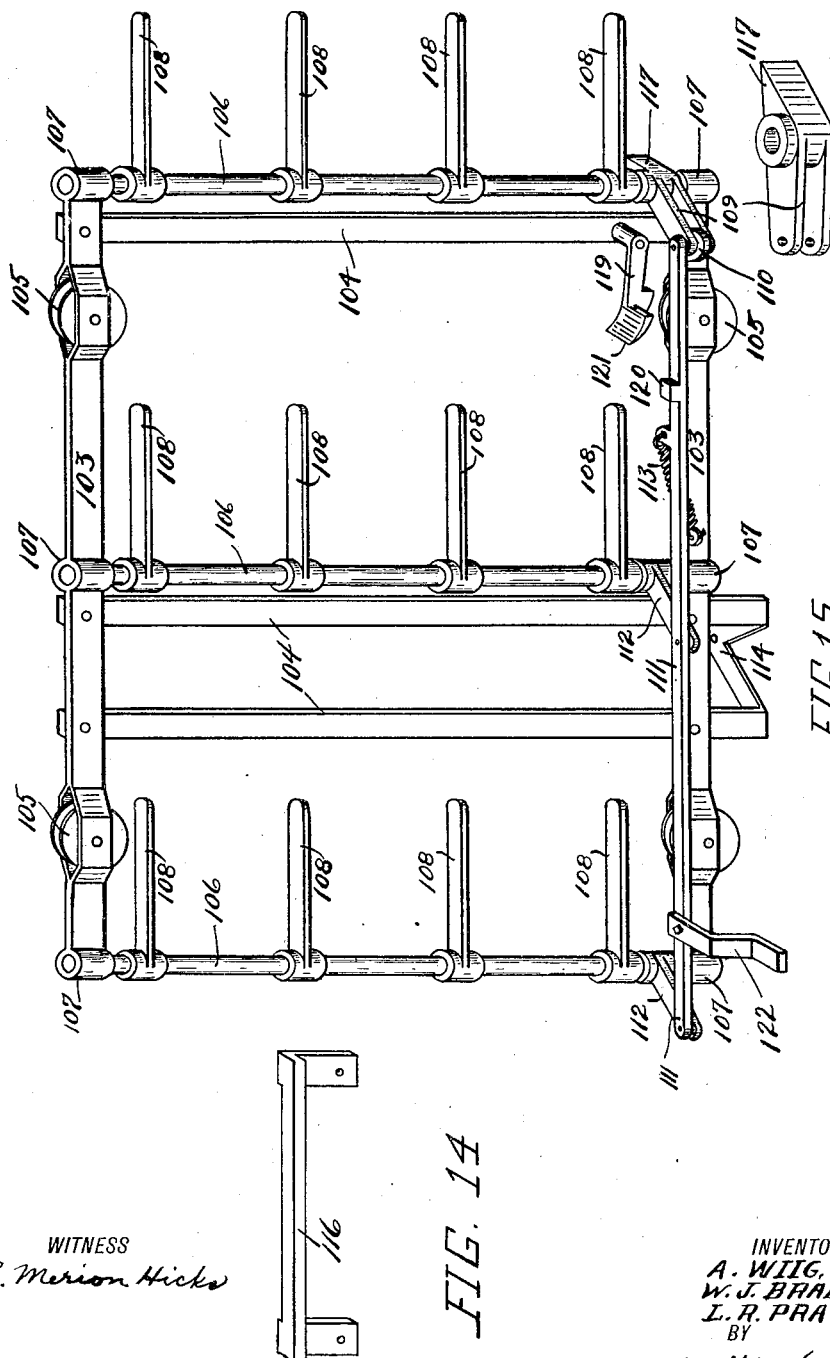

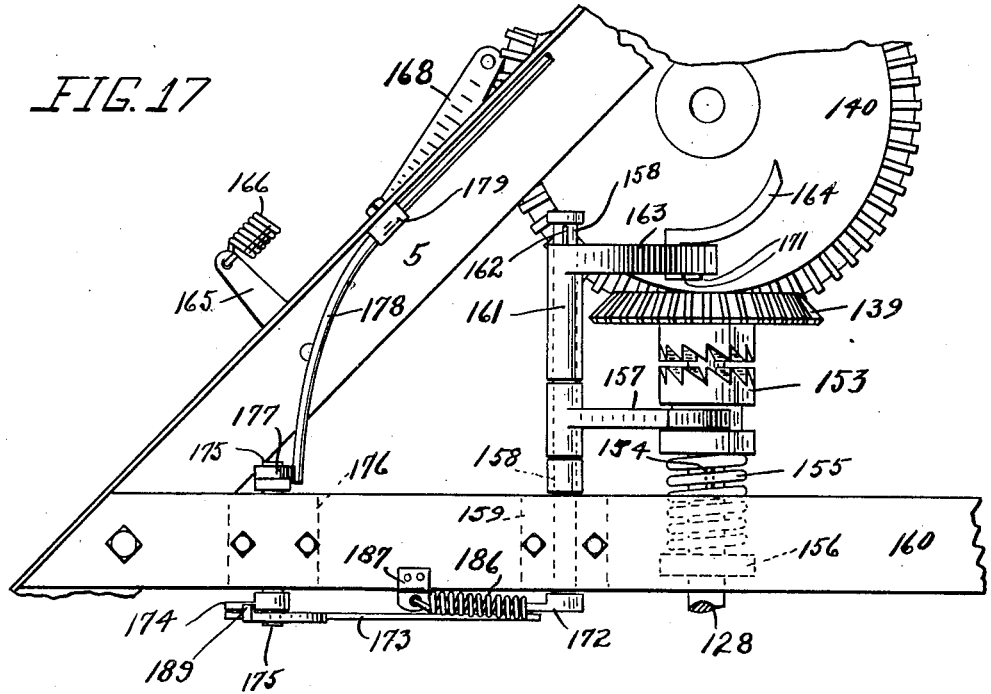
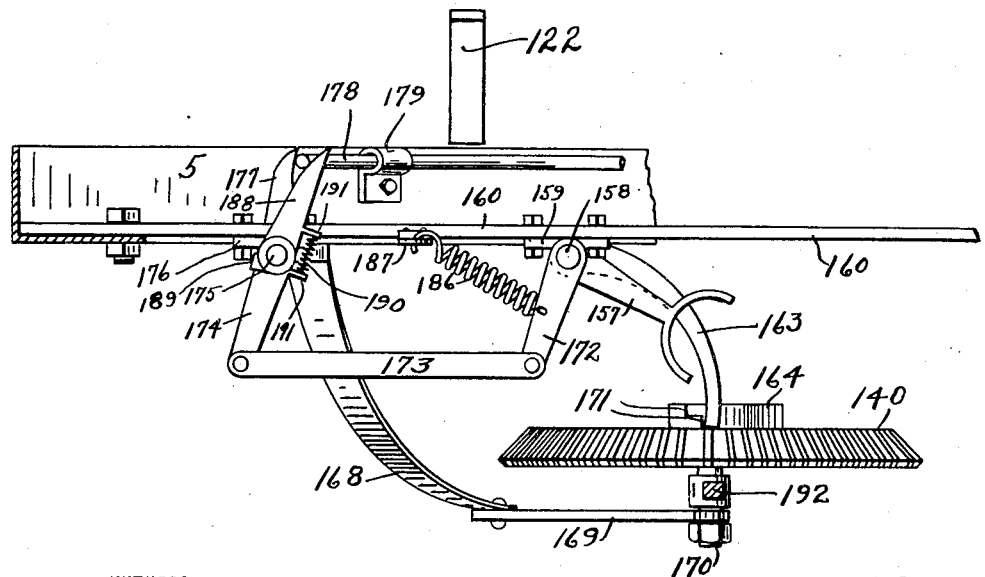

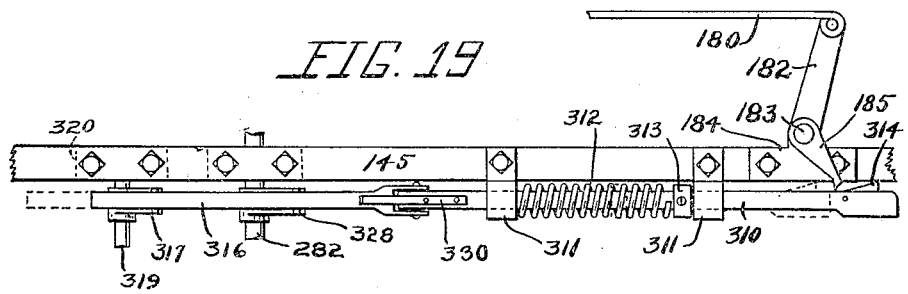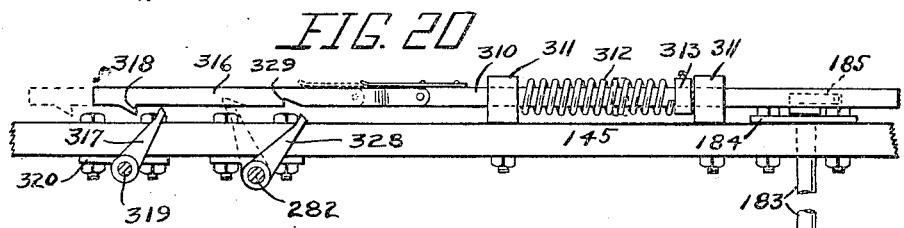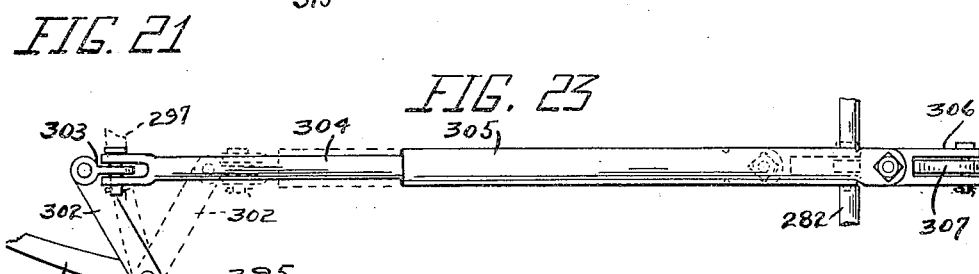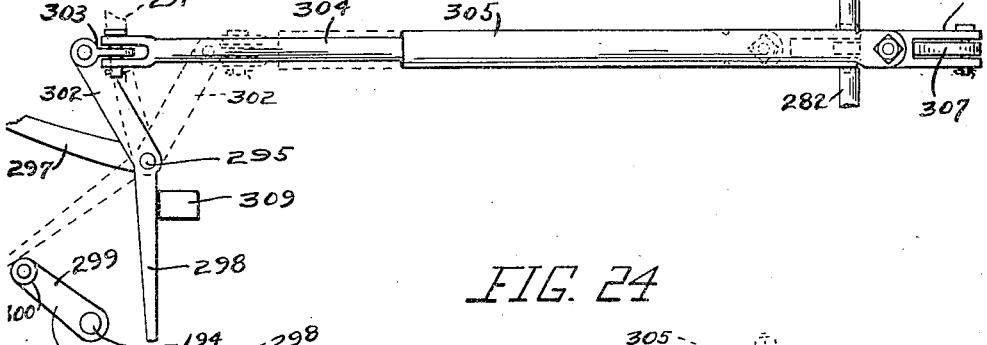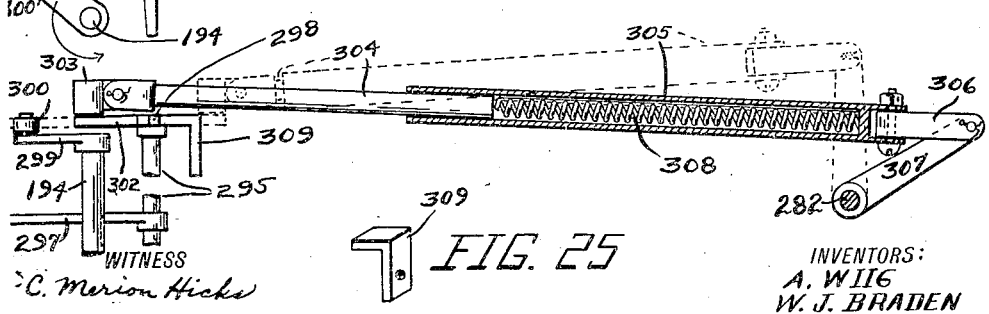

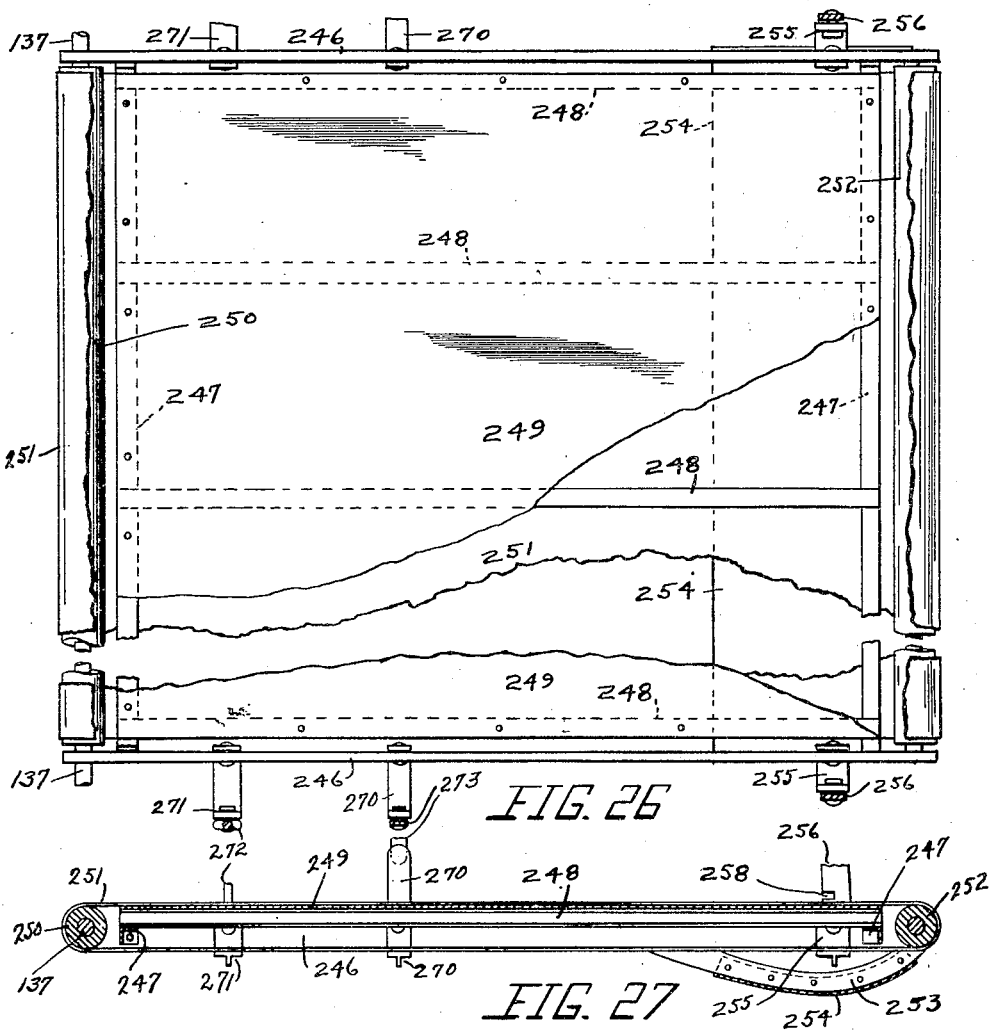

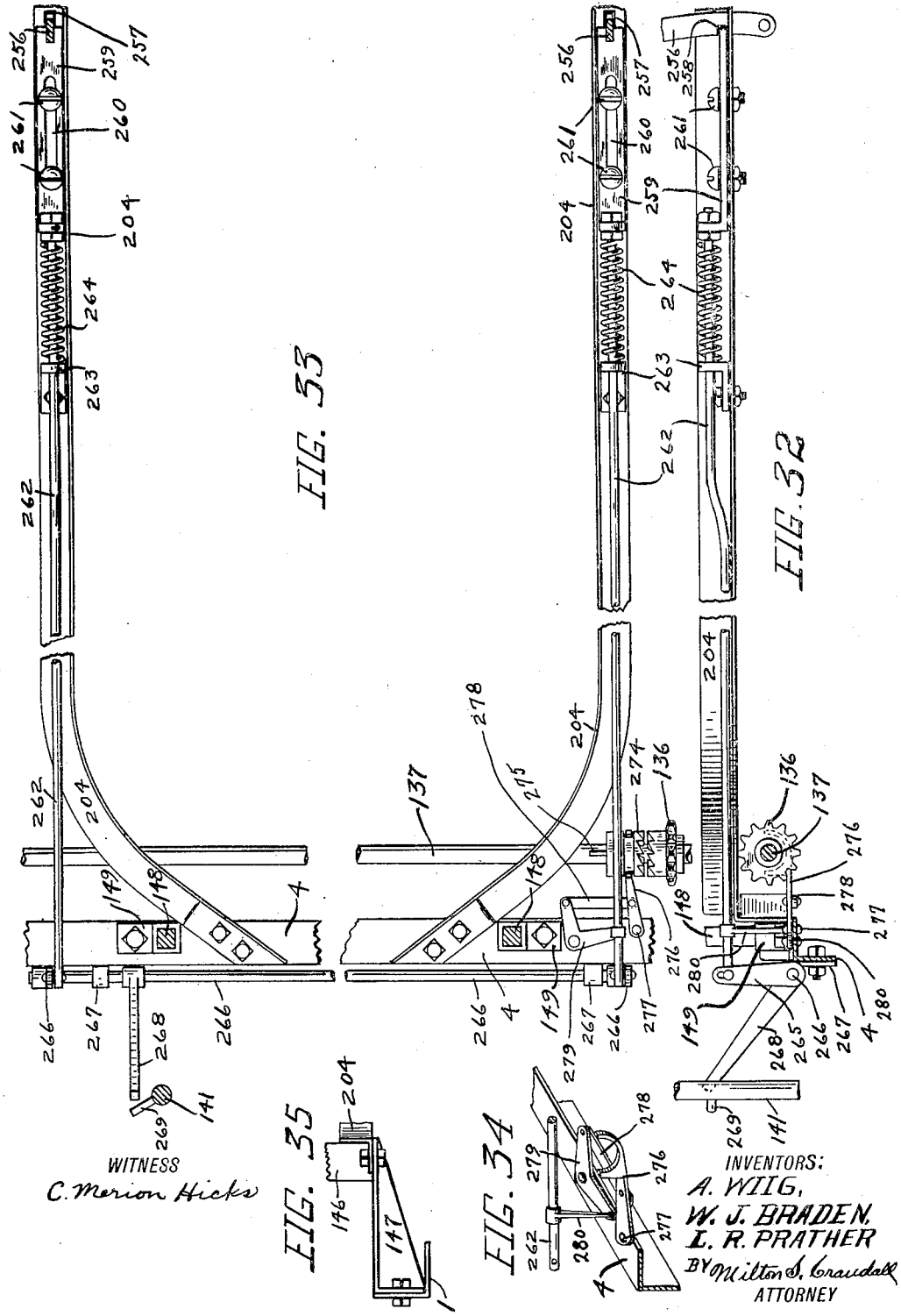

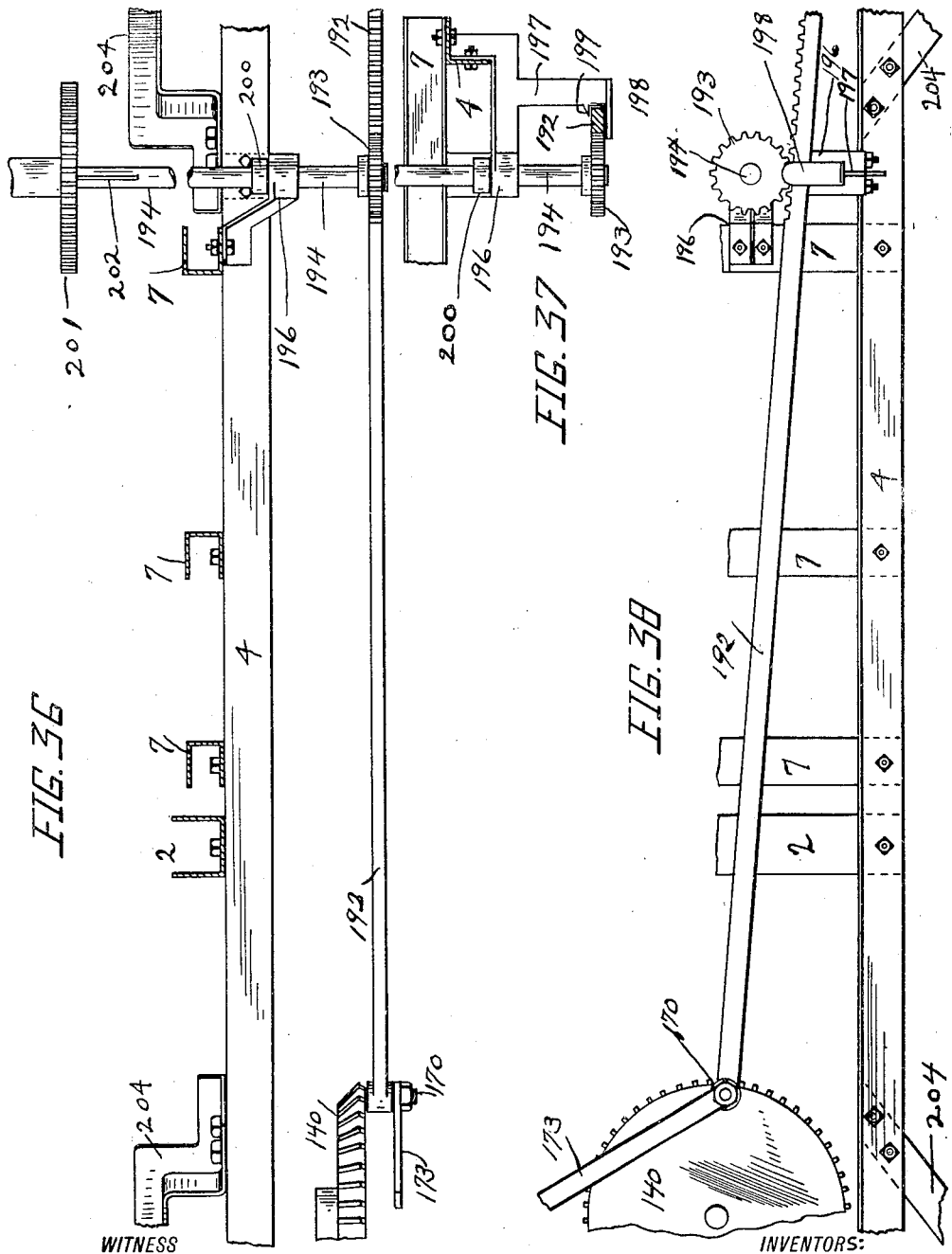

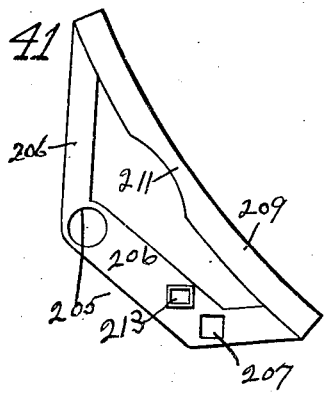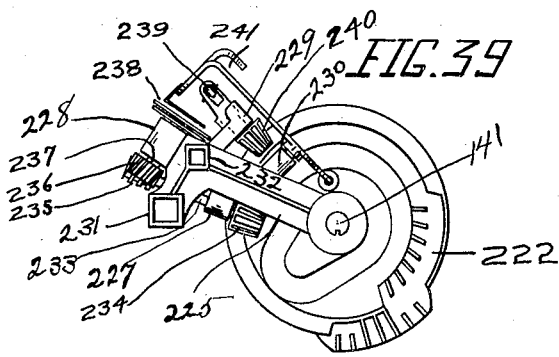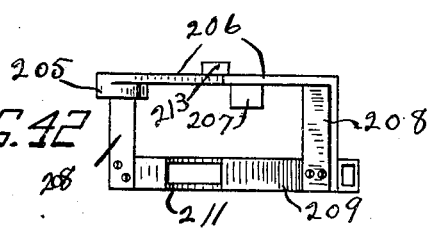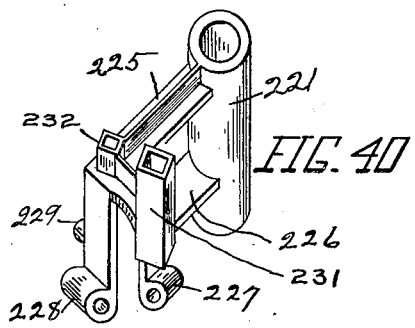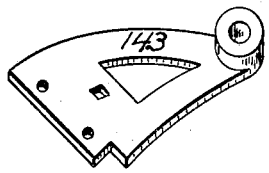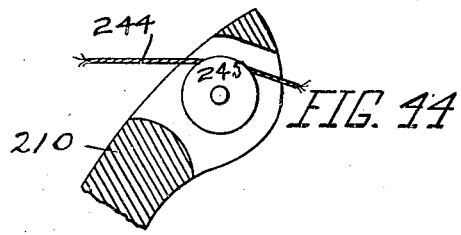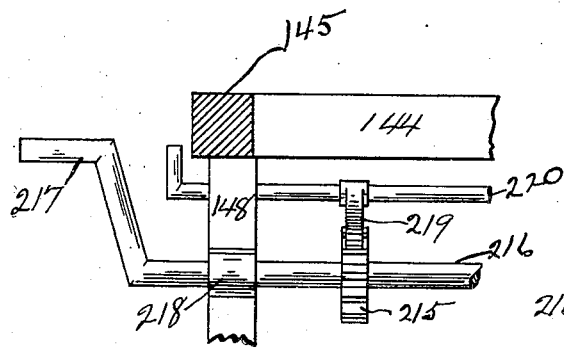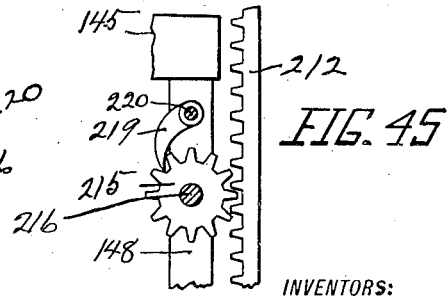

ADOLPH WIIG AND WILLIAM J. BRADEN, OF SIOUX CITY, AND LEE R. PRATHER, OF DES MOINES, IOWA, ASSIGNORS TO PEERLESS SHOCKER MANUFACTURING COMPANY, OF SIOUX CITY, IOWA, A CORPORATION OF SOUTH DAKOTA.

GRAIN-SHOCKER.

1,355,108.  Specification of Letters Patent.  Patented Oct. 5, 1920.

Application filed August 24, 1915. Serial No. 47,098.

*To all whom it may concern:*

Be it known that we, ADOLPH WIIG and WILLIAM J. BRADEN, citizens of the United States, and residents of Sioux City, in the county of Woodbury and State of Iowa, and LEE R. PRATHER, a citizen of the United States, and a resident of Des Moines, in the county of Polk and State of Iowa, have invented certain new and useful Improvements in Grain-Shockers, of which the following is a specification.

The present invention relates to grain-shockers.

The invention has for its primary object the production of an improved machine adapted to receive the sheaves from a harvester, form and bind them into shocks and then set the shocks off on the ground.

Another object of the invention, is the production in a machine of this sort, of an improved shock-forming and delivering means.

A still further object of the invention is the production of a grain-shocker wherein the efficiency is increased and the cost of manufacture reduced to the minimum.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a side elevation of a machine constructed in accordance with the invention, parts being cut away;

Fig. 2 is a plan of the same, with portions cut away;

Fig. 3 is a side elevation opposite to Fig. 1;

Fig. 4 is a fragmentary perspective view of a harvester with the device of our invention attached thereto;

Fig. 5 is an enlarged right side elevation of the bundle-receiver and parts associated therewith;

Fig. 6 is a front elevation of the same;

Fig. 7 is a perspective view of the crank and controlling means therefor;

Fig. 8 is a perspective view of the crank-stop-bolt and latch-lever;

Fig. 9 is a front elevation of the transverse bundle-conveyer;

Fig. 10 is a plan of the same;

Fig. 11 is a side elevation of the conveyer-actuating bell-crank;

Fig. 12 is a plan of the same;

Fig. 13 is an enlarged perspective view of the conveyer-actuating bell-crank bearing;

Fig. 14 is a perspective view of the cam-controlling track of the longitudinal bundle-conveyer;

Fig. 15 is a perspective view of the longitudinal bundle-conveyer;

Fig. 16 is an enlarged similar view of the longitudinal conveyer arm-controlling cam;

Fig. 17 is an enlarged plan of a portion of the knotter-shaft controlling means;

Fig. 18 is a side elevation of the same, the clutch being omitted;

Fig. 19 is a plan of the trip mechanism of the knotter-shaft controlling means;

Fig. 20 is an inside elevation of the same;

Fig. 21 is an enlarged horizontal section of one end of the trip-bar;

Fig. 22 is a rear elevation of the same;

Fig. 23 is a plan of the shock-compressor-bar and parts associated therewith;

Fig. 24 is a side elevation of the same, partly in section;

Fig. 25 is a perspective view of the compressor stop;

Fig. 26 is a fragmentary plan of the shock-platform and conveyer;

Fig. 27 is a vertical section of the same;

Fig. 28 is a side elevation of the same;

Figs. 29, 30 and 31 are perspective views of the shock-platform side lugs;

Fig. 32 is a fragmentary side elevation of the shock-conveyer controlling means;

Fig. 33 is a plan of the same;

Fig. 34 is a perspective view of the shock-conveyer clutch-controlling means.

Fig. 35 is a rear elevation of one of the main-frame supporting-brackets;

Fig. 36 is a fragmentary front elevation of the knotter-needle actuating means and members associated therewith;

Fig. 37 is a side elevation of the same;

Fig. 38 is an inverted plan of the same;

Fig. 39 is a plan view of the knotter and knotter-frame;

Fig. 40 is a perspective view of the knotter-frame;

Fig. 41 is a plan of the knotter-needle guide;

Fig. 42 is a side elevation of the same;

Fig. 43 is a perspective view of the upper knotter-shaft bearing;

Fig. 44 is an enlarged longitudinal section of the head of the knotter-needle;

Fig. 45 is a fragmentary side elevation of the knotter mechanism adjusting means, and Fig. 46 is a rear elevation of the same.

Although we have illustrated and hereinafter described the preferred embodiment of the invention, we would not be understood as being limited to the specific structure chosen for illustration, for various alterations and modifications in the details of construction and arrangement of parts, may be made without departing from the spirit and scope of the invention as defined in the appended claims.

The invention contemplates broadly, an improved machine adapted to travel beside a harvester and including a sheaf-receiving means, a platform upon which the shock is formed, means for conveying the sheaves from the receiving means to the platform, means for forming and compressing the sheaves into the shock, and means for binding and delivering the shock.

In its preferred form the machine embodies mechanism governed by the sheaf-receiving means for actuating the conveying means, and mechanism governed by the shock-forming means and the conveying means for the automatic control of the shock-binding and delivering mechanism; all of which will presently be made clear.

Referring, now, more particularly to Figs. 1 to 4, the main frame consists of long and short side members, 1 and 2, the former of any suitable shape and size and the latter preferably of channel iron with the flanges upwardly disposed. The forward ends of the side members are interconnected by an angle-iron cross-member, 3; and the rear end of the side member 2 is connected with the opposite member by an intermediate cross-member, 4, which extends beyond the side member, 2, and supports the intermediate portion of a side-member, 5, the forward portion of which is bent at an angle and secured to the adjacent side-member, as at 6. 7 are intermediate longitudinal members secured upon the cross-members.

The machine is mounted upon caster-wheels, 8, and a center power-wheel, 9, mounted on the main shaft, 10, journaled in suitable bearings, 11, mounted on the main frame.

The sheaf-receiving mechanism, (Figs. 1, 2, 4, 5 and 6) consists of an eccentric, 12, freely mounted upon the main-shaft, and the collar, 13, of which is connected by a rod, 14, with a crank-arm, 15, depending from a shaft 16, journaled in bearings, 17, mounted upon the main-frame.

Upon the shaft, 16, are mounted brackets, 18, to which are secured the ends of the side-members, 19, of a sheaf-receiving frame or table having cross-bars, 20, inter-connecting the said side members.

The hub, 21, of the eccentric, 12, is ratchet faced to co-act with a ratchet-faced collar, 22, encircling the main shaft and movable longitudinally thereof upon a key, or feather, 23. 24 is a compression-spring, interposed between the collar, 22, and a boss, 25, upon the main-shaft.

Mutual engagement of the clutch members, 21, and 22, is normally prevented by a shifting-arm, 26, pivoted at one end upon a bracket, 27, mounted on the main-frame; and having its opposite end formed in a fork, 28, engaging an annular groove, 29, in the movable clutch member. 30 is a bell-crank fulcrumed upon the shifting arm and having one arm engaged with a cam, 21, on the face of the eccentric and formed with a shoulder, 32, which engages the upper edge of the latter arm and serves as a normal stop for the eccentric. The opposite arm, 33, of the bell-crank is bent downwardly, (Fig. 6) and connected by a link, 34, with a crank-arm, 35, depending from a rock-shaft, 36, journaled in bearings, 37, mounted on the main-frame. Upon the shaft, 36, are mounted trip-arms, 38, extending upwardly through the sheaf-receiving frame and having their upper portions bent substantially horizontally. 40 is a crank-arm mounted on the said shaft and connected by a retracting-spring, 41, with the frame member 1.

Referring now, to Fig. 4, 42 represents a portion of the main-frame of a harvester, 43, the tongue, 44, the knotter-shaft and 45 the usual discharge-arms. 46 is the deck of the harvester, to which is preferably secured a sheet-metal apron, 47, curved slightly upwardly and then downwardly above the side of the sheaf-receiving table of the shocker to serve as a guide for the sheaves and elevate them slightly prior to delivery.

The shocker is suitably secured to the harvester as by a draw-bar, 48, secured at one end to the tongue and at the opposite end to an ear, 49, on the forward end of the shocker. 50 is a spacing link, connecting the intermediate portion of the frame member, 1, with the main-frame of the harvester.

By virtue of the structure now disclosed it is evident that when a sheaf is dropped upon the trip-arms the latter will be depressed, thereby turning the trip-shaft and causing the crank-arm, 35, and link, 34, to turn the bell-crank out of engagement with the stop-cam on the eccentric, whereupon the clutch members, 21 and 22, will co-act with the eccentric to draw the crank, 15, rearwardly. When the eccentric has made a half revolution, the sheaf-receiving frame will have assumed an upright position and thereby set the sheaf upright upon the floor, 51, of the shocker, and in a position to be received by the conveyer, as will presently appear.

The sheaf having been removed from the trip-arms, the spring, 41, will act to restore the bell-crank to its normal position; and as the eccentric completes its revolution, the cam, 31, will engage the bell-crank, force the clutch-member, 22, from engagement with its companion and coincidentally the stop, 32, coacts with the bell-crank to stop the eccentric.

The conveyer mechanism operates in conjunction with and is controlled by the sheaf-receiving means. The controlling means therefor consists of a shaft, 52, mounted to the rear of the power wheel, journaled in suitable bearings, 53, mounted under the side members of the main-frame and carrying a forwardly disposed arm, 54, engageable by a pin, or stud, 55, on the side of the eccentric. Upon the opposite end of the said shaft is secured a crank-arm, 56, connected by a rod, 57, with one arm of a bell-crank, 58, fulcrumed on a bracket, 59, mounted on the main-frame. The other arm of said bell-crank is pivoted to a latch-bolt, 60, (Figs. 7 and 8), supported by an inverted U-shaped frame, 61, mounted on the side of the main-frame and provided with openings, 62, through which the latch-bolt is free to slide. 63 is a curved latch-lever fulcrumed near its upper end to the inner side of the frame, 61, and having its lower end, 64, reduced, curved concentrically with the fulcrum and adapted to enter an opening, 65, in the latch-bolt.

The latch-bolt serves as a normal stop for a crank, 66, formed with a ratchet-faced hub freely mounted upon the main-shaft and engageable by a ratchet-faced collar, 67, encircling the main-shaft, slidable longitudinally thereof on a key or feather, 68, and controlled by a shifting-fork formed on one arm of a bell-crank, 69, fulcrumed on a bracket, 70, mounted on the side of the main-frame. The other arm of the said bell-crank is bent downwardly, and bifurcated, as at 71, to inclose the rod, 57, between bosses, 72, engageable with opposite sides of the latter arm.

It is now evident that during the revolution of the eccentric, the stud, 55, thereon will engage the under side of the lever, 54, thereby turn the shaft, 52, and force the connecting-rod, 57, forwardly to actuate the bell-cranks, 58 and 69. As the former withdraws the stop-bolt, 60, the latch-lever will engage and hold the stop-bolt out of the path of the crank.

Coincident with the withdrawal of the stop-bolt, the clutch-shifting bell-crank, 69, acts to force the clutch member, 67, into engagement with its companion, and thus actuate the crank.

As the crank is about to complete its revolution, a stud, 73, on its inner side, engages the upper end of the latch-lever and withdraws the lower end thereof from the stop-bolt, permitting the latter and the shifting clutch member to assume their normal positions, through the medium of an arm, 74, depending from the shaft, 52, and connected by a retracting-spring, 75, with an ear, 76, mounted on the main-frame.

The main crank oscillates a horizontal double bell-crank fulcrumed on a suitable bearing, 77, mounted on the main-frame; and having forwardly and rearwardly inclined arms, 78 and 79, respectively and an outer arm, 80, connected by a swivel-ended connecting-rod, 81, with the main crank.

On the under side of the arm, 78, (Figs. 1, 2, 11 and 12), is secured an ear, 82, yieldably connected by a spring, 83, with a depending lug, 84, on the main-frame. The said spring serves to retract the main crank to its normal position should the clutch member, 67, be untimely released.

The transverse conveyer is preferably a reciprocating carriage, (Figs. 9 and 10) comprising a suitable frame including uprights, 85, the ends of which are secured between mated horizontal bars, 86, between the ends of which are rotatably mounted flanged wheels, 87, the lower ones of which travel upon the flange of the front cross-member, 3, of the main-frame; and the upper ones of which are guided by the flange of an oppositely disposed angle-iron, 88, supported by corner-posts, 89, mounted on the main-frame. 90 are sheaf-supporting arms, each having one end secured to the carriage frame, as at 91, and the opposite end bent rearwardly.

92 is an upright shaft, journaled in suitable bearings, 93, on the frame, and carrying sweep-arms, 94, normally extending toward the left side of the machine. The lower end of said shaft is provided with a crank-arm, 95, normally disposed at an angle toward the left side of the machine and connected by a rod, 96, with the bell-crank arm, 78.

97 are longitudinal guard-rails, disposed inwardly from the inner vertical plane of the side member, 2, and having their ends bent laterally, as at 98, and secured, respectively, to the corner post, 89 and a post, 99, secured to the rear portion of the said side member.

100 are U-shaped guard-rails the arms of which are disposed on opposite sides of the main wheel in parallelism with the rails, 97, and secured to posts, 101, secured to the intermediate frame members, 7 and formed with upper cross-members, 102.

The said guard-rails form a passage for the sheaves and also serve to prevent entanglement thereof with moving parts of the machine, as will presently appear.

The coöperation of the eccentric-stud, 55, and lever, 54, is so timed, with respect to the sweep of the eccentric, that the main crank will actuate the conveyers coincidentally with the upending of the sheaves.

A sheaf having been set upright upon the floor, as previously set forth, the conveyer-arms, 94, through the action of the double bell-crank, will be turned rearwardly to the position shown in Figs. 9 and 10, and said movement will sweep the sheaf toward the arms, 90. Further movement of the double bell-crank then draws the conveyer-carriage, and the sheaf is thus conveyed to the opposite corner of the machine and embraces the guard-rails, 97.

The longitudinal conveyer, (Figs. 2, 3 and 15) comprises a suitable frame including upper and lower bars, 103, inter-connected by a front and intermediate uprights, 104. The upper and lower bars are formed with divided portions, within which are rotatably mounted flanged wheels, 105, the lower of which travel upon the inner flange of the channel-iron frame-member, 2, and the upper of which are guided by the corresponding flange of an angle-iron, 2A, secured to the posts, 89 and 99.

At the ends and center of the conveyer-frame are upright shafts, 106, journaled in suitable bearings, 107, formed in the frame and carrying sweep-arms, 108. The foremost of said shafts is provided at its lower end with a bifurcated lever-arm, 109, in which is rotatably mounted a friction-roller, 110, and which is connected by a bar, 111, with lever-arms, 112, mounted on the other of said shafts.

A retracting spring, 113, secured to the connecting bar, 111, and the carriage-frame tends to draw the bar rearwardly and direct the sweep-arms forwardly, as seen in Fig. 15.

The lower ends of the carriage-frame-uprights, 104, are bent inwardly and converge, forming a V-shaped draw-head, 114, connected by a rod, 115, with the ball-crank arm, 79.

The friction-roller 110, travels adjacent a rail, 116, mounted on the main-frame; and serves to hold the sweep-arms, 108, rigidly in parallelism with or at right-angles to the carriage-frame, according as the direction of travel.

It will now be observed that the conveyers travel toward the front right corner of the machine simultaneously. As the longitudinal conveyer moves forwardly, its sweep-arms are extended forwardly so as not to encounter the sheaf carried by the other conveyer.

The foremost shaft, 106, of the side conveyer is armed with a cam, 117, which may be formed integrally with the arm, 109. As the conveyer nears the forward end of its travel, the cam, 117, engages a fixed upright, 118, on the main-frame, the friction-roller, 110, passes the end of its track and the cam and upright coact to turn the sweep-arms at right-angles to the conveyer as the latter moves to the extreme end of its travel. The foremost sweep-arms will then be in position to engage and carry the sheaf rearwardly, and will be held secure against retrograde movement, (prior to engagement of the friction-roller with its track) by a dog, 119, pivoted on the conveyer-frame and engaged with a shoulder, 120, on the connecting-bar.

As the double bell-crank starts to reciprocate, the side conveyer carries the sheaf rearwardly clear of the arms, 90, of the other conveyer while the sweep-arms, 94, of the latter are assuming their normal position. The front conveyer is then returned to the opposite corner and the rearward movement of the sheaf continued until the side conveyer nears the position shown in Figs. 1, 2 and 3, forcing the sheaf through the passage formed by the guard-rails and between yieldable bars, 123, secured to the guard-rails. The said bars extend rearwardly, and inwardly and have their free ends bent laterally to embrace the forward sides of the sheaves. As the conveyer nears its rearward position, the friction roller, 110, passes from its track and the dog, 119, is raised out of engagement with its lug by a curved ear, 121, on the dog, engaging a suitable stop, as the upwardly-extended end, 124, of the bell-crank hanger, 59, (Figs. 1 and 3). The spring, 113, then retracts the connecting-bar and sweep-arms as previously described. The conveyer then returns to the front, and in a similar manner the foremost sweep-arms convey another sheaf rearwardly, and the intermediate sweep-arms carry the first sheaf beyond the intermediate gate members, 123. Upon the third operation of the conveyer, the rearmost sweep-arms carry the first sheaf beyond the rearmost of said gates.

The shock-forming and delivering mechanism is actuated by a sprocket-wheel, 125, mounted on the main-shaft and connected by a chain, 126, with a sprocket-wheel, 127, mounted on a counter-shaft, 128, journaled in suitable bearings, 129, mounted below the main frame. The latter shaft carries a spur-gear, 130, engaged with a similar gear, 131, fixed on a spindle, 132, journaled in a suitable bearing, 133, mounted on the main-frame. The said spindle carries a small sprocket-wheel, 134, connected by a chain, 135, with a similar wheel, 136, free upon a shaft, 137, journaled in bearings, 138, mounted on opposite sides of the main-frame.

Upon the opposite end of the counter-shaft is freely mounted a bevel-pinion, 139, intermeshed with a bevel-gear, 140, mounted on an upright shaft, 141, journaled in a lower bearing, 142, mounted below the main-frame; and an upper bearing, 143, secured to an upper frame having a cross-member, 144, side members, 145, and supported by rear angle-iron posts, 146, mounted upon brackets, 147, extending inwardly from the side members of the main-frame; and square posts, 148, secured in sockets, 149, mounted upon the main-frame member, 4. (Figs. 33 and 35.)

The shock is formed between side rails, 150, the rear ends of which are bent outwardly and are secured to the rear posts, as at 151; and the forward portions thereof are curved inwardly to join the rails, 97, and 100.

Referring, now, more particularly to Figs. 2, 17 and 18, the bevel-pinion, 139 is formed with a ratchet-faced hub, engageable by a ratchet-faced collar, 153, encircling the counter-shaft and slidable on a key or feather, 154. A compression-spring, 155, interposed between said collar and a boss, 156, on said shaft, tends to force the movable collar into engagement with its companion. The movable collar is controlled by a shifting-fork, 157, freely mounted upon a shaft, 158, journaled in a bearing, 159, mounted on a supporting beam, 160, secured to the main-frame. The extended end of the latter shaft is encircled by sleeve, 161, slidable on a key or feather, 162, and carrying a downwardly curved arm, 163, the end of which normally rests upon the bevel-gear, 140. The face of the latter member is formed with a cam, 164, which engages the arm, 163, to slide the sleeve and shifting arm inwardly, thereby forcing the clutch member, 153, out of engagement with its companion.

On the main-frame is fulcrumed a bell-crank, one arm of which, 165, is connected by a retracting-spring, 166, with an ear, 167, mounted on the main-frame; and the other arm of which, 168, is curved below the plane of the bevel-gear, 140, and is connected by a link, 169, with a crank-pin, 170, on said gear.

The said bell-crank serves to complete the revolution of the gear in case the clutch should be prematurely disengaged; and to impart the first movement to the gear when the controlling mechanism is tripped, as will be presently amplified.

The cam, 164, is formed with shoulders, or steps, 171, the lower of which engages the forward side of the arm, 163, and serves as a normal stop (Fig. 18).

Upon the inner end of the controlling shaft, 158, is a crank-arm, 172, connected by a link, 173, with a crank-arm, 174, on a shaft, 175, journaled in a bearing, 176, mounted on the beam, 160. On the opposite end of the latter shaft is an upwardly disposed arm, 177, engaged by the inwardly-curved end of a push-rod, 178, slidable in bearings, 179, mounted on the main-frame; and connected by links, 180, (Figs. 2 and 3), sliding in bearings, 181, on the main-frame. The rear link, 180, is pivoted to a crank-arm, 182, on an upright shaft, 183, journaled in bearings, 184, mounted on the upper frame and a guard-rail. The upper end of said shaft is armed with an inwardly-extending trip-lever, 185.

Referring again to Figs. 17 and 18, a retracting-spring, 186, is secured to the crank-arm, 172, and an ear, 187, on the supporting member, 160. The said spring tends to force the shifting-arm, 163, downwardly against the bevel-gear, and also retract the shaft, 175, the push-rods, 178 and 180, and their associated parts.

A trip-lever, 188, is freely mounted upon the shaft, 175, and provided with an off-set heel, 189, normally embracing the front edge of the adjacent crank-arm. A compression-spring, 190, is interposed between ears, 191, on the rear side of the trip-lever and the adjacent crank-arm, respectively.

The connecting-bar, 111, of the longitudinal conveyer, carries an outwardly-disposed depending arm, 122, (Figs. 2 and 18) which normally clears the trip-arm, 188, as the conveyer reciprocates.

It will be observed, however, that when the rear trip-arm, 185, on the upper frame, is moved rearwardly, (by means to be later disclosed) the arm, 182, the push-rods and lever, 177, will coact to raise the shifting-arm, 163, from engagement with the lower shoulder of the cam, whereupon the bell-crank and spring, 166, turn the bevel-gear until the upper cam shoulder, 171, engages the shifting-arm. This operation turns the trip-arm, 188, directly in the path of the conveyer part, 122. The trip-arm, 188, is yieldable rearwardly and has no effect upon its associated parts when the conveyer travels to the rear. As the latter starts forwardly, however, the depending part engages the trip-arm and thereby raises the shifting-arm clear of the cam, whereupon the clutch-member, 153, is forced into engagement and coacts with its companion to revolve the bevel-gear, 140. The conveyer having passed over and released the trip-lever, the shifting-arm is again brought into engagement with the face of the bevel-gear, and as the latter is completing its revolution, the cam coacts with the shifting-arm in disengaging the clutch and stopping the bevel-gear.

The bevel-gear, 140, drives a pitman, 192, pivoted on the wrist-pin, 170, and extending transversely of the machine. The free end of the pitman is toothed to drive a pinion, 193, fixed on the lower end of an upright shaft, 194, (Figs. 1, 36, 37 and 38) and journaled in bearings, 195 and 196, mounted on the upper frame and main-frame, respectively. The latter bearing is formed with a hanger, 197, having a bearing-plate, 198, which slidably supports the pitman in the same plane as the pinion. The hanger prevents disengagement of the pitman from the pinion; and is provided with an ear, 199, extending above the pitman to prevent upward displacement thereof. The shaft is supported by a boss, 200, resting upon the bearing, 196.

Upon the intermediate portion of the shaft, 194, is mounted a spur-gear, 201, slidable upon a key or feather, 202, and formed with an elongated hub having a head, or shoulder, 203, resting upon a supporting-collar, 205, freely encircling the hub and having arms, 206, one of which is provided with a flanged opening, 207, (Figs. 41 and 42) to slidably inclose the adjacent post, 148. The said arms have depending ends, 208, which support a horizontal segmental guide-housing, 209, within which reciprocates a curved knotter needle, 210, actuated by engagement of the spur-gear, 201 with the teeth of the needle within an opening, 211, in the housing.

The above-described needle-gear supporting member is adjustably supported by a rack, 212, the lower end of which is secured within a socket, 213, formed on said member, and the upper end slides through a guide-bearing, 214, mounted on the upper frame, and is engaged by a pinion, 215, mounted on a shaft, 216, provided with a crank, 217, and journaled in bearings, 218, formed in the posts, 148. Downward movement of the rack is prevented by a dog, 219, mounted on a rod, 220, and engaged with the pinion. Said rod being freely inclosed by openings in said posts, may be turned to disengage the dog when adjusting the needle and knotter mechanism.

We employ the familiar Appleby knotter supported by a suitable frame, comprising (Figs. 3, 39 and 40) a collar, 221, adapted to freely inclose the elongated hub of the knotter cam wheel, 222, mounted on the shaft, 141, slidable on a key or feather, 223, and having a flange, 224, resting upon the said collar. The collar is formed with the usual frame arms, 225 and 226, and bearings, 227, 228, 229 and 230. The frame is cast integrally with a casing, 231, freely inclosing the adjacent post, 148. The frame is supported similarly to the needle-gear support, by a rack, 212, the lower end of which is secured in a socket, 232, on the knotter-frame; and the upper end of which is controlled by a pinion on the adjusting shaft, 216, as previously described.

The knotter mechanism is familiar in the art and only sufficient elements thereof have been represented to illustrate the application to the present invention.

233 represents the intermediate pinion-shaft rotating in the bearing, 227, and carrying the intermediate pinion, 234, and worm, 235, driving the worm, 236, on the disk-pin, 237, turning within the bearing, 228. 238 represents the knotter-disk, 239, the knotter hook, and tongue and 240 the knotter pinion supported by the bearing 229. The knife arm is represented at 241, fulcrumed in the bearing 230.

242 represents the twine-cam, mounted on a bracket, 243, on the main-frame. The twine, 244, passes over a roller, 245, (Fig. 44) in the eye of the needle, and across the mouth of the sheaf-passage and its end is held by the twine-disk, as customary.

As the bevel-gear, 140, makes its first half revolution, the rack, 192, imparts a complete revolution of the needle-gear, 201, thus driving the needle across to coact with the knotter mechanism on the opposite side of the machine. As said bevel-gear makes the last half of its revolution, the toothed pinion and needle-gear reciprocate and retract the needle.

The shock is formed upon a platform pivoted at its forward end and preferably comprising a suitable frame including side members, 246, (Figs. 26 to 31) pivoted at their forward ends upon the shaft, 137, and interconnected by cross members, 247, supporting longitudinal beams, 248, upon which is laid a sheet-metal floor, 249.

The shaft, 137, carries a fixed roller, 250, connected by an endless, canvas conveyer, 251, with a similar roller, 252, rotatably mounted between the rear ends of the side members.

The said side members are formed with curved runners, 253, which slide upon the ground when the platform is released. A sheet-metal fender, 254, is secured to and extends between the said runners to prevent the canvas from encountering obstacles.

The platform is normally supported by longitudinally disposed angle-irons, 204, mounted above the sides of the platform. The said angle-irons have their forward ends curved inwardly, offset downwardly and secured to the cross-member, 4, of the main-frame, (Figs. 32—33). The rear ends of said angle-irons are secured to the brackets, 147 on the main-frame.

Upon the rear portions of the platform are mounted side-lugs, 255, pivotally secured to upwardly-extended bars, 256, curved concentrically with the platform pivot and protruding through openings, 257, in the angle-irons. The said bars are provided with transverse notches, 258, which are normally engaged by latch-plates, 259, slidable upon the angle-irons, and provided with longitudinal slots, 260, through which pass guide-bolts, 261, in the angle iron.

The forward ends of the said latch-plates are upturned and secured to rods, 262, slidably inclosed by bearings, 263, mounted on the angle-irons, and between which and the latch-plates are interposed compression-springs, 264, which tend to force the latch-plates rearwardly.

The forward ends of the rods, 262, are pivoted to lever-arms, 265, carried by a shaft, 266, journaled in bearings, 267, on the main-frame. The said shaft carries an arm, 268, inclined forwardly adjacent the upright shaft, 141, which carries a stud, or pin, 269, so positioned that when the shaft is completing its revolution, the said pin will engage the upper side of the arm, 268, force it downwardly and thus turn the shaft, 266, to withdraw the latch-plates from the notches, 258, and thereby release the platform.

Upon the shaft, 137, is mounted a ratchet-faced clutch member 274, slidable on a key or feather, 275, and engageable with the ratchet-faced hub of the free sprocket-wheel, 136. The movable clutch-member is controlled by a shifting-fork, 276, pivoted upon the main-frame as at 277, (Fig. 34) and connected by a link, 278, with one arm of a bell-crank, 279, fulcrumed on the main-frame. The other arm of the bell-crank is pivotally secured to the end of an arm, 280, depending from the adjacent rod, 262.

By virtue of this mechanism, the endless conveyer is actuated. Simultaneously with the release of the platform, the arm, 280 coacts with the bell-crank to shift the clutch-member, 274, into operative relation with its companion.

Engagement of the latch-plates with the forward edges of the bars, 256, prevents retraction of the rods, 262, and thereby holds the clutch in operative position until the platform has been restored to normal by means presently to be described.

Referring now, more particularly to Figs. 1 and 2, 282 is a transverse shaft; journaled in suitable bearings, 283, mounted on the intermediate portion of the upper frame. The end portions of said shaft carry arms, 284, normally forwardly inclined and connected with the upper ends of links, 273, by wrist-pins, 285, operating within longitudinal slots, 286, in said links. The lower ends of said links are pivotally secured to lugs, 270, secured to the sides of the shock-platform.

From the side of the upper frame depend rods, 287, connected by yieldable links, as springs, 288, with links, 272, pivoted to lugs 271 secured to the forward portion of the sides of the platform.

The extreme ends of the shaft, 282, carry crank-arms, 289, normally rearwardly inclined and yieldably connected by rods, 290, and at springs, 291, with rods, 292 secured to the main-frame. Upon the shaft 282, is secured a substantially U-shaped depending gate, comprising side members, 293, joined at their lower ends with a rearwardly-curved cross member, 294.

The gate, it will be observed, normally declines forwardly, but is yieldable rearwardly by virtue of the spring, 291, and the compressor mechanism, to be later described.

The compressor mechanism, (Figs. 1, 2, 23 and 24) embodies an upright shaft, 295, journaled in suitable bearings, 296, mounted on the forward portions of the rails, 150; and a bearing 301, on the upper frame. The said shaft carries compressor-arms, 297, normally extending diagonally toward the sheaf-passage and adapted to sweep across the mouth thereof. The upper end of said shaft carries an arm, 298, normally extended toward the left side of the machine and actuated by a crank, 299, mounted on the needle-gear shaft, and having a friction-roller, 300, mounted on its wrist-pin.

The compressor-shaft, 295, carries an inwardly-disposed arm, 302, connected by a swivel, 303, with a rod, 304, telescoping a hollow shaft, 305, connected by a swivel, 306, with an arm, 307, mounted on the shaft, 282, and normally rearwardly inclined. The hollow shaft incloses a compression-spring, 308, interposed between the rod, 304 and the farther end of the inclosing shaft, which spring holds the arm, 298, yieldably against a stop, 309, mounted on the frame; and also aids the retracting link, 291, in forcing the gate forwardly.

As the needle-gear shaft, 194, is turned in the direction indicated by the arrow in Fig. 23, the friction-roller, 300, will engage and carry the arm, 298, to the position shown in broken lines, and thus swing the packer-arms rearwardly at the time the knotter-needle is driven toward the knotter-hook. The forward movement of the arm 298, also forces the compression-rod, 304, rearwardly, and thereby imparts further pressure on the gate to compress the rear side of the shock, as will later appear.

As the needle-gear shaft reciprocates, the compressor mechanism is retracted by the spring, 308.

The trip mechanism for the control of the shock-forming and delivering means, (Figs.

19 to 22) includes a horizontal bar, 310, slidably mounted in bearings, 311, mounted on the upper frame. The said bar is inclosed by a compression-spring, 312, interposed between the foremost of said bearings and a shoulder, 313, on the bar. The rear end of said bar is channeled and has pivoted therein a pawl, 314, engageable with the trip-arm, 185, when the bar moves rearwardly.

A compression-spring, 315, between the free end of the pawl and the inner side of the bar, permits the pawl to yield and freely pass the trip-arm as the bar is drawn forwardly.

316 is a horizontal bar pivoted to the forward end of the bar, 310, to turn vertically. The former bar normally rests upon an arm, 317, adapted to engage a shoulder, 318, on the bar; and is mounted on a shaft, 319, journaled in bearings, 320, on the upper frame, and carrying at one end an arm, 321, connected by a link, 322, with one arm of a bell-crank, 323, fulcrumed on the rear upper frame; and the other arm of which is connected by a link, 324 with one arm of a bell-crank, 325, fulcrumed on a bearing, 326, mounted on the post, 146. To the other arm of the latter bell-crank may be attached a line, 327, (Fig. 2).

The above mechanism is provided for use when it is desired to set the shocks in rows. By pulling upon the line, 327, the driver actuates the bell-cranks, 325 and 322 which coact to force the arm, 321, forwardly, whereupon the arm, 317, engages the shoulder, 318, and carries the trip bar forwardly. When the latter arm turns sufficiently to disengage from the shoulder, the compression-spring forces the trip-bar rearwardly, whereupon the pawl, 314, acts upon the trip-arm, 185; causing the arm, 182, to release the binding and delivering mechanism as previously set forth.

The shaft, 282, carries an arm, 328, similar to the arm, 317, and adapted to engage a shoulder, 329, of the draw-bar, 316, and automatically actuate the latter as will presently be made more clear.

The draw-bar, 316, is held yieldingly adjacent the arm, 317, by a torsion-spring, 330, secured to the bar, 310, and engaged with the draw-bar.

As the sheaves are successively forced onto the platform they carry the span of twine, between the needle and knotter, rearwardly, drawing slack from the twine-holder. The pressure of the sheaves gradually forces the gate rearwardly, turning the shaft, 282. Thus, when the shock-former is well filled with sheaves, the gate depends rearwardly from the supporting shaft and the wrist-pins, 285, of arms, 284, are in the lower ends of the slots, 286. Upon further rearward movement of the gate, the arm, 328, will have tripped the bar, 310, which causes the trip, 188, to be placed in the path of the arm, 122, on the side conveyer.

As previously stated, the trip is not actuated by the forward movement of the side conveyer. As the conveyer starts forwardly, however, the trip is engaged and the shaft, 141, revolves, its first half revolution causing the packer-arms and gate to compress the sheaves into a shock; and the needle and knotter mechanism to bind the shock. And during the latter part of the revolution of said shaft, the platform is released and the platform conveyer actuated.

As the platform drops, due to the weight of the shock, the links 273, draw the arms, 284, downwardly to the positions indicated in broken lines in Figs. 1 and 3, thus raising the gate to clear the shock; and turning the crank-arms, 289, just beyond the upper center.

The U-shaped packer-gate prevents any tendency of the shocks to tilt rearwardly, with respect to the platform, when the latter starts to drop, for the platform drops a distance before the slotted links, 273, actuate the arms, 284, to swing the gate rearwardly.

The shock having left the platform, the springs 288, restore the latter to its normal position; and the slotted links, 273, act upon the shaft, 282, to move the crank-arms off their center, whereupon the latter will be drawn downwardly by the springs, 291, and thereby restore the gate to normal.

Having thus described our invention, what we claim as new and desire to secure by Letters Patent of the United States, is,—

1. A sheaf-shocker comprising a shock-former including a frame, a shock-supporting endless-conveyer carried thereby movable between upper and lower positions, adapted to be moved to the latter position by the weight of the shocks and operable in the latter position to deliver the shocks therefrom, releasable means for normally holding the endless-conveyer in its upper position, means pivoted on the frame to yieldably embrace the shocks and adapted to be swung from the shocks by movement of the endless-conveyer to its lower position to permit delivery of the shocks, means for releasing the holding means, yieldable means adapted to retract the endless-conveyer to an intermediate position after delivery of the shocks, and means controlled by retraction of the endless-conveyer to its intermediate position to retract the embracing means and restore the endless-conveyer to its upper position, and means for receiving and conveying the sheaves to the shock-former.

2. A sheaf-shocker comprising a shock-inclosing frame, a shock-supporting endless-conveyer carried thereby, movable between upper and lower positions, and operable in the latter position to deliver the shocks therefrom, releasable means for normally holding the endless-conveyer in its upper position, means for releasing the holding means, a vertically swinging gate adapted to embrace the shocks and be swung therefrom to permit delivery of the shocks, yieldable means operable to retract the gate and hold it in engagement with the shocks, and adapted to be placed in and out of operative relation with the gate, means actuated by the lowering of the endless-conveyer for placing the yieldable means out of operative relation with the gate and swinging the gate from the shocks, means for retracting the endless conveyer to an intermediate position subsequent to delivery of the shocks, means actuated by retraction of the endless-conveyer to its intermediate position for placing the yieldable means in operative relation with the gate and restoring the endless conveyer to its upper position, and means for receiving and delivering the sheaves to the shock inclosing frame.

3. A sheaf-shocker comprising a shock-inclosing frame, a shock supporting endless-conveyer carried thereby movable between upper and lower positions, and operable in the latter position to deliver the shocks therefrom, releasable means for normally holding the endless-conveyer in its upper position, means for releasing the holding means, a horizontal rock element carried by the frame and disposed transversely of and above the endless-conveyer, forwardly and rearwardly disposed crank-arms on said element, a gate depending from said element, yieldable links between the latter arms and the frame to force the gate forwardly, connections between the forwardly disposed arms and the endless-conveyer whereby the gate is swung rearwardly when the endless-conveyer is lowered, the rearwardly disposed arms being so positioned as to be substantially on dead-centers when the endless-conveyer is in its lower position, means for partially retracting the endless-conveyer after delivery of the shocks, whereby the latter arms are forced rearwardly and the yieldable links retract the endless-conveyer and the gate, and means for receiving and delivering the sheaves to the shock-inclosing frame.

4. A sheaf-shocker comprising a shock-inclosing frame, a shock-supporting endless-conveyer carried thereby movable between upper and lower positions, and operable in the latter position to deliver the shocks therefrom, releasable means for normally holding the endless conveyer in its upper position, means for releasing the holding means, a horizontal rock element carried by the frame and disposed transversely of and above the endless-conveyer to partially retract the latter from its lower position, forwardly and rearwardly disposed crank-arms on said element connecting links between the forwardly disposed arms and the endless-conveyer to swing the gate rearwardly from the shocks by lowering the endless-conveyer, the rearwardly disposed arms being so positioned as to be substantially on dead-centers when the endless-conveyer is in its lower position and through the medium of the connecting links, be forced rearwardly by the partial retraction of the endless-conveyer, whereby the first said yieldable links retract both the gate and the endless conveyer, and means for receiving and delivering the sheaves to the inclosing frame.

In testimony whereof we have hereunto set our hands.

ADOLPH WIIG.
WILLIAM J. BRADEN.
LEE R. PRATHER.